(12) United States Patent
Zhou et al.

(10) Patent No.: US 7,826,671 B2
(45) Date of Patent: Nov. 2, 2010

(54) METHOD AND SYSTEM FOR QUANTIZATION LAYER REDUCTION IN DIGITAL IMAGE PROCESSING

(75) Inventors: Zhi Zhou, Corona, CA (US); Yeong-Taeg Kim, Irvine, CA (US)

(73) Assignee: Samsung Electronics Co., Ltd., Suwon (KR)

(*) Notice: Subject to any disclaimer, the term of this patent is extended or adjusted under 35 U.S.C. 154(b) by 1016 days.

(21) Appl. No.: 11/603,466

(22) Filed: Nov. 21, 2006

(65) Prior Publication Data

US 2008/0118170 A1  May 22, 2008

(51) Int. Cl.
*G06K 9/36* (2006.01)
(52) U.S. Cl. ...................................... 382/232
(58) Field of Classification Search .................. 382/232, 382/251, 264, 274, 275; 375/240.02, 240.03; 348/404.1, 405.1; 341/155, 167, 168, 169
See application file for complete search history.

(56) References Cited

U.S. PATENT DOCUMENTS

| | | | |
|---|---|---|---|
| 5,218,649 A | 6/1993 | Kundu et al. | |
| 5,598,482 A | 1/1997 | Balasubramanian et al. | |
| 5,801,657 A * | 9/1998 | Fowler et al. | 341/155 |
| 7,148,831 B2 * | 12/2006 | Krymski | 341/155 |
| 7,541,963 B2 * | 6/2009 | Krymski | 341/170 |
| 7,551,795 B2 | 6/2009 | Xu et al. | |

* cited by examiner

*Primary Examiner*—Jose L Couso
(74) *Attorney, Agent, or Firm*—Kenneth L. Sherman, Esq.; Michael Zarrabian, Esq.; Myers Andras Sherman LLP

(57) ABSTRACT

An image processing method and system is provided for reducing the quantization layer in an input quantized image. The system detects if a pixel in a quantized input image belongs to a ramp area in a selected direction. Based on such ramp detection, a quantization level is dynamically selected. Then, a pre-segmentation operation is performed on a smoothly changing image area for each pixel in that direction. That area can then be refined by segmentation. A low-pass filtering process can then be applied to the refined segment to obtain filtered pixels. An overall gain value is then determined and used to adjust the filtered pixel luminance values to obtain output luminance values with higher precision values than that of the input image luminance values. This provides an output video image with reduced quantization layer and less perceivable quantization artifacts.

44 Claims, 11 Drawing Sheets

400

600

700

800

810

930

METHOD AND SYSTEM FOR QUANTIZATION LAYER REDUCTION IN DIGITAL IMAGE PROCESSING

FIELD OF THE INVENTION

The present invention relates to digital image processing, and in particular to quantization layer reduction in digital image processing.

BACKGROUND OF THE INVENTION

A natural scene usually contains some smoothly changing areas where luminance levels are changing gradually. When such a scene is captured by a digitization device into a digitized image, the luminance value for each pixel in the smoothly changing areas is quantized by an analog-to-digital (A/D). As a result, the digitized image may contain quantization artifacts such as stage-like false contours. Because quantization artifacts are perceivable by the human eye, the smoothly changing areas in the natural scene no longer look smooth in the digitized image.

The magnitude of quantization artifacts is determined by the quantization accuracy in the A/D converter of the digitization device. This magnitude is not necessarily the same as the smallest step of the digitization device. Indeed, it is usually much larger and makes the quantization artifacts more perceivable to human eyes.

To eliminate these types of quantization artifacts, first their location must be identified, and then smoothing processes performed thereon. In general, within a large slowly changing region the quantization artifacts resemble steps. However, identifying quantization artifacts in a digitized image of a natural scene is a difficult task. This is because such identification requires detecting whether the quantization artifacts are caused by the quantization of smoothly changing areas in the original scene, or if they are actual features in the original scene itself.

The presence of additive noise introduced by the digitization device makes such a detection more complicated. This is because additive noise makes the areas containing quantization artifacts look as small detailed regions in the original scene. If a noisy area is detected as an area that contains quantization artifacts, the smoothing process must reduce the noise, as well as the image quantization layer (or bit-plane).

Further, a smoothly changing area may look stage-like even when the luminance of neighboring pixels is only changing by the smallest possible step. In this case, a higher precision content of the smoothly changing area is desired in order to eliminate the quantization artifacts. With the higher precision content, halftoning techniques such as error diffusion or spatial dithering can be used to quantize the higher precision content to the current bit depth. The quantization artifacts will no longer be perceivable on the halftoned image due to the spatial averaging characteristics of the human visual system. There is therefore, a need for a method and a system for reducing the quantization layer in a quantized image.

BRIEF SUMMARY OF THE INVENTION

The present invention provides a method and a system for reducing the quantization layer in a quantized image. In one embodiment of the present invention, reducing the quantization layer involves detecting if a selected pixel in an image area belongs to a ramp area in a certain direction in the input image. Based on such ramp detection, a quantization level is dynamically selected.

Then, a pre-segmentation operation is performed on an approximate smoothly changing image area for each pixel in that direction. That area is then refined by segmentation. A low-pass filtering process is then applied to the segmented area (i.e., the refined segment) to obtain filtered pixels. An overall gain value is determined and used to adjust the filtered pixel luminance values to obtain output luminance values with higher precision values than that of the input image luminance values. This provides an output video image with reduced quantization layer and less perceivable quantization artifacts.

These and other features, aspects and advantages of the present invention will become understood with reference to the following description, appended claims and accompanying figures.

DETAILED DESCRIPTION OF THE INVENTION

The present invention provides a method and a system for reducing the quantization layer in a quantized image. In one embodiment of the present invention, reducing the quantization layer involves detecting if each pixel in an image area belongs to a ramp area in a certain direction in the input image. Based on such ramp detection, a quantization level is dynamically selected.

Figure 1:
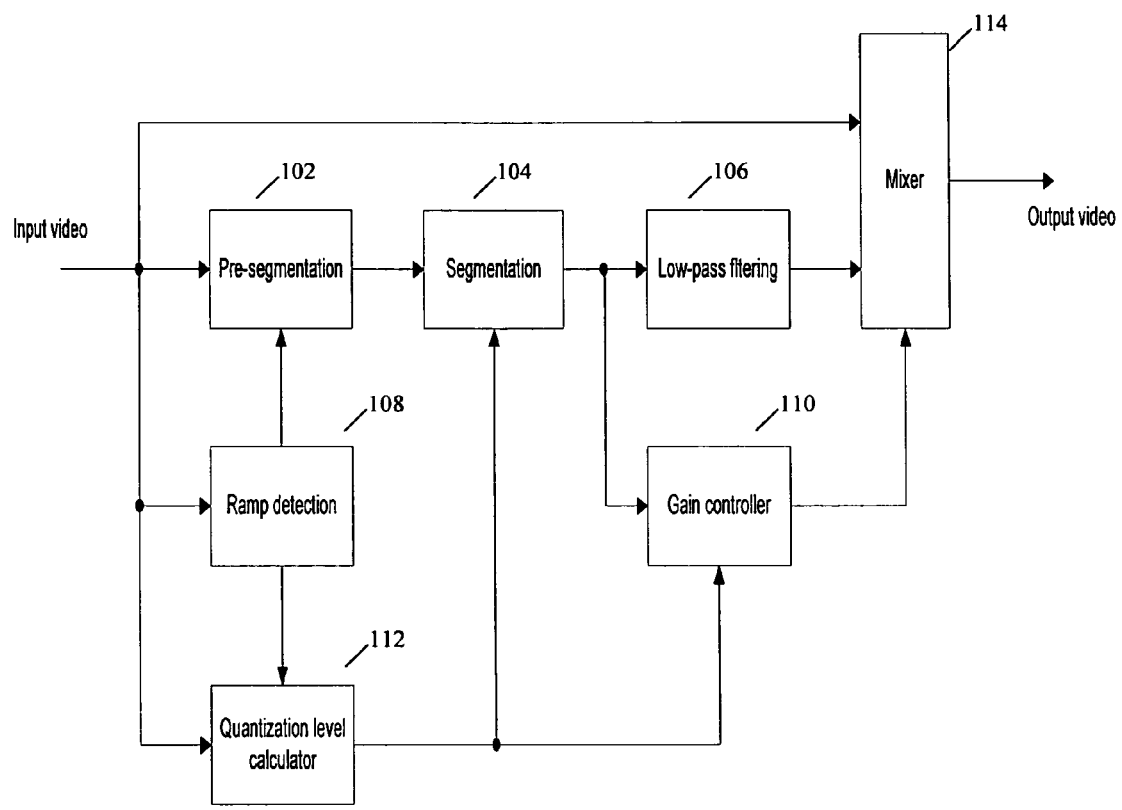
FIG. 1 shows an example of a functional block diagram of an embodiment of a quantization layer reduction system that implements a quantization layer reduction method, according to an embodiment of the present invention.

FIG. 1 shows an example of a functional block diagram of an embodiment of an image processing system 100 which implements a quantization layer reduction method according to an embodiment of the present invention. The system 100 comprises a pre-segmentation module 102, a segmentation module 104, a low-pass filtering module 106, a ramp detection module 108, a gain controller module 110, a quantization level calculator module 112, and a mixer module 114. In an example shown in FIG. 2, the system 100 performs quantization layer reduction in a pre-defined direction for each pixel in an area (window) 200 that is centered at the pixel of interest 204. In this example, the quantization layer reduction method is applied in the horizontal direction 206 over the pixel of interest 204, which is applied to the pixels 202 in that direction within the local window 200. The quantization layer reduction method can be applied along any direction (e.g., vertical, diagonal, etc.).

Figure 2:
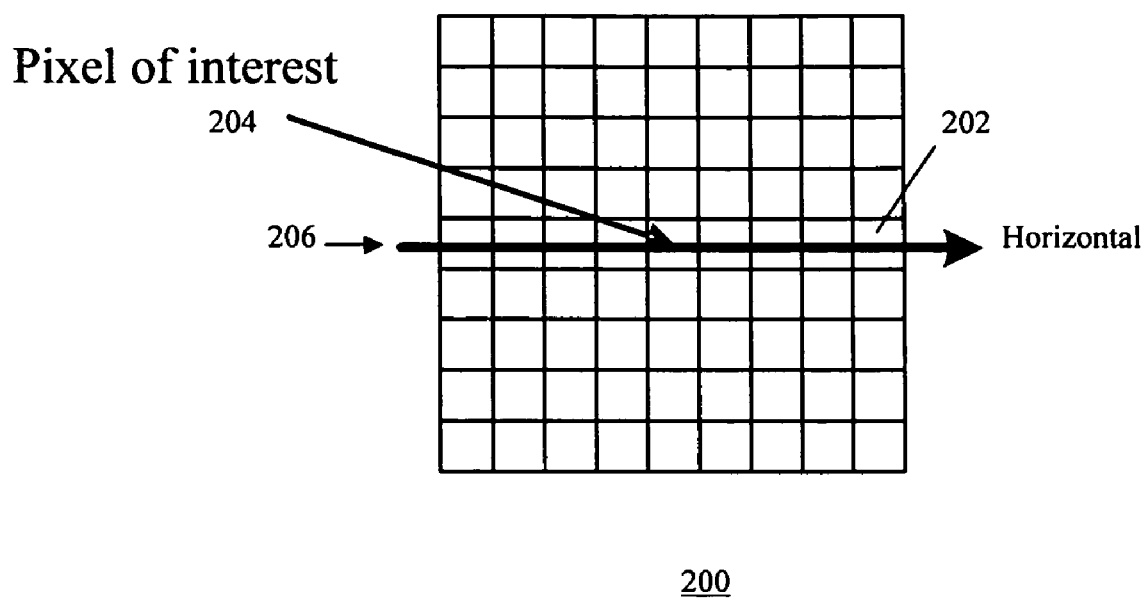
FIG. 2 shows a diagrammatical example of an application of a quantization layer reduction method to a set of digitized image pixels in the horizontal direction, according to an embodiment of the present invention.

For the example shown in FIG. 2, the ramp detection module 108 (FIG. 1) examines the pixels 202 along the direction 206 to detect if the pixel of interest 204 belongs to a ramp area in the direction 206. Based on the ramp detection results, the quantization level calculation module 112 estimates a quantization level q from the pixels 202 in the direction 206.

Further, the pre-segmentation module 102 applies pre-segmentation to the pixels 202 in the direction 206 to obtain a pre-segmented area including the pixel of interest 204. Then, the segmentation module 104 refines the pre-segmented area to obtain a refined segment area including the pixel of interest 204, based on the quantization level q. The low-pass filter 106 then filters the refined segment area to obtain a higher precision luminance value for the pixel of interest 204.

The gain control module 110 performs several luminance value measurements on the refined segment area to generate an overall gain. Based on the overall gain, the mixer 114 mixes the higher precision luminance value from the low-pass filter with the original luminance of the pixel of interest 204 to obtain an output luminance value. This provides an output video image with reduced quantization layer and less perceivable quantization artifacts.

An example of ramp detection by the ramp detection module 108 is now described. The quantization layer often occurs in ramp areas in a digitized/quantized image. Before segmentation by the segmentation module 104 (FIG. 1), the ramp detector module 108 detects whether the pixel of interest 204 belongs to a ramp area in the direction 206. If so, a higher quantization level is used by the segmentation module 104 to segment a larger smoothly changing area in the image area 200. Otherwise, a smaller quantization level is used.

The ramp detection module 108 determine if the pixel of interest 204 belongs to a ramp area in the direction 206 by comparing the luminance of the pixels in direction 206 to a threshold th. To cancel out the effect of noise, in one example the threshold th is determined by the luminance values of the pixels 202 in the direction 206. In another example, the threshold th is determined by averaging the maximum and the minimum luminance values of the pixel values in the direction 206. As those skilled in the art will recognize, other example of calculating the threshold th can be utilized.

Then, certain events which indicate if two neighboring pixels in the direction 206 are located above or below the threshold th are counted. The pixels with a luminance value equal to the threshold th are temporally removed during the counting. A ramp is detected if the total count is less or equal to one, which indicates that the pixel of interest belongs to a ramp area. Otherwise, the pixel of interest does not belong to a ramp area.

Figure 3A:
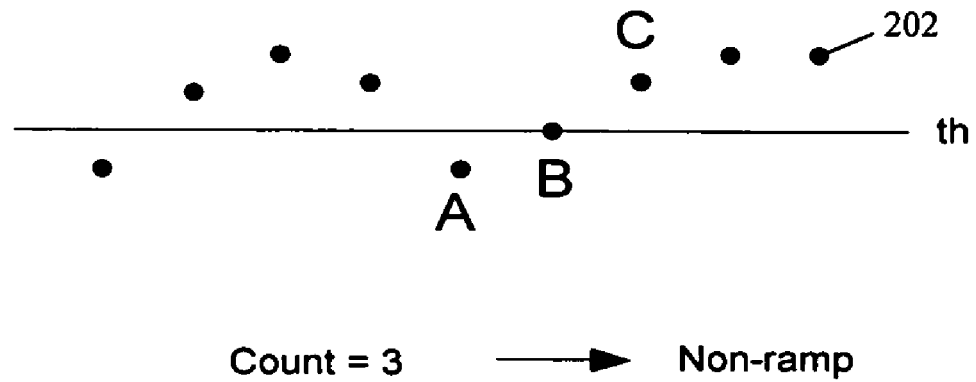
FIGS. 3A-B show examples of ramp detection in a chosen direction, according to an embodiment of the present invention.

FIG. 3A shows an example set of pixels 202 including neighboring pixels A, B and C, along the direction 206. The luminance of the pixel A is below the threshold th, the luminance of the pixel B is equal to the threshold th, and the luminance of the pixel C is above the threshold th. Since the luminance of the pixel C is above the threshold th and the luminance of the pixel A is below the threshold th, one event is counted. Using the same process, two more events are counted for the remaining pixels in FIG. 3A, bringing the total count for FIG. 3A to three. Since the total count for the pixels in FIG. 3A is greater than one, this indicates that the pixel of interest among the pixels 202 is in a non-ramp area. In this example, the segmentation module 104 uses a smaller quantization level to segment the image area 200.

Figure 3B:
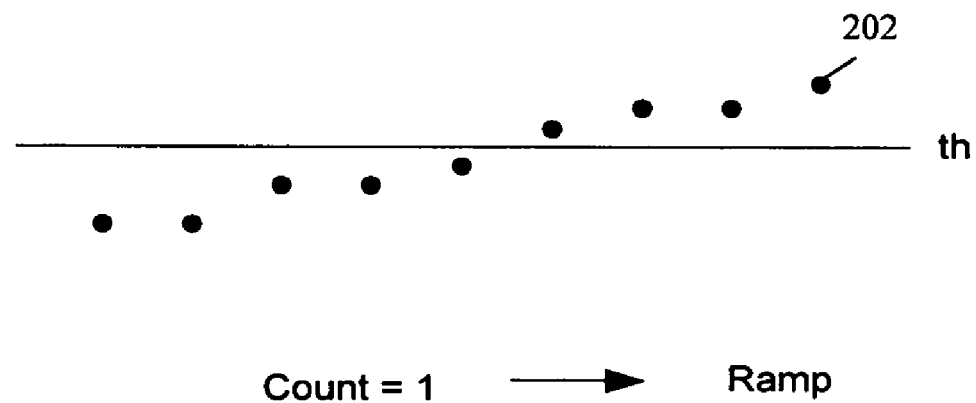

FIG. 3B shows another example set of pixels 202 including the pixel of interest. Applying the above counting process to the example in FIG. 3B results in a total count of one event for all of the pixels in FIG. 3B. This indicates the existence of a ramp area and that the pixel of interest does belong to the ramp area. In this example, the segmentation module 104 uses a higher quantization level to segment a larger smoothly changing area in the image area 200.

An example of quantization level calculation by the quantization level calculation module 112 (FIG. 1) is now described. As discussed, ramp detection in a direction 206 determines if the pixel of interest 204 is in a ramp area. If the pixel of interest 204 is in a non-ramp area, then the pixel of interest 204 in the digitized image may contain information for actual small details in the original scene as opposed to quantization artifacts. Therefore, in that case, it is preferable to keep the original pixel value for the pixel 204 without filtering in order to conserve the original scene information for the small details.

The quantization level calculation module 112 selects the quantization level q based on the steepness of the ramp area. If the pixel of interest 204 is in a ramp area along the direction 206, then the quantization level q is selected to be large enough (i.e., max_quant) to cover an entire smoothly changing area in the image area 200. Thereafter, filtering is applied to the smoothly changing area.

If the pixel of interest 204 belongs to a non-ramp area along the direction 206, the smallest quantization level (i.e., min_quant) is selected as the quantization level q.

Figure 4:
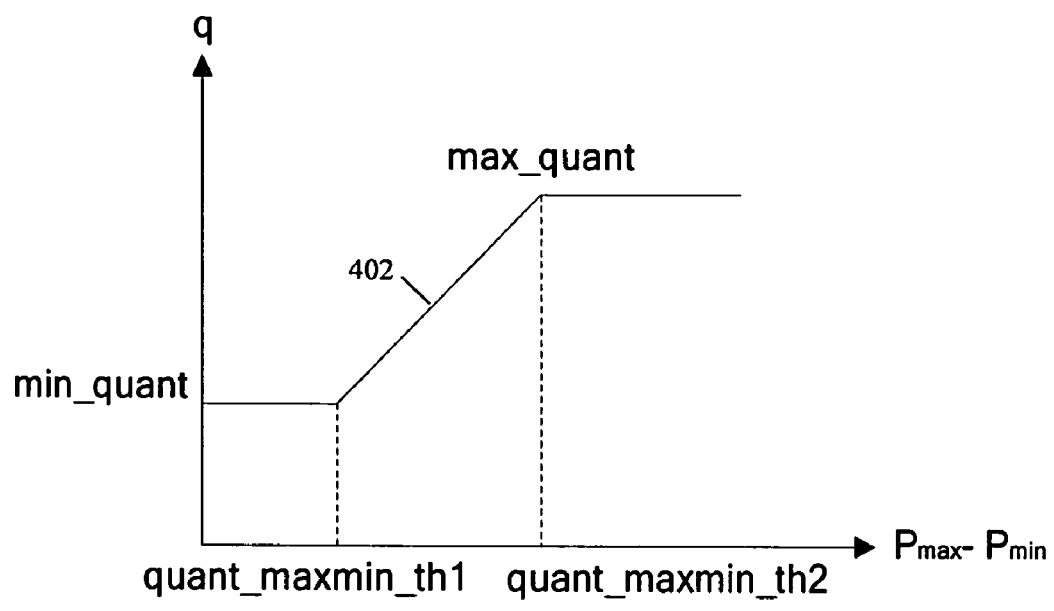
FIG. 4 shows an example of computing the quantization level of a ramp area, according to an embodiment of the present invention.

FIG. 4 shows a diagrammatical example 400 for selecting the quantization level q based on the graph 402. For ramp areas, the quantization level q is determined by the absolute difference of the maximum luminance $P_{max}$ and the minimum luminance $P_{min}$ of pixels 202 in the direction 206.

If the absolute difference is smaller than a predefined threshold quant_maxmin_th1, then the quantization level q is set to the value min_quant; if the absolution difference is greater than a pre-defined threshold quant_maxmin_t2, then the quantization level q is set to the value max_quant; otherwise, the quantization level q is set to a linearly interpolated value between quant_maxmin_th1 and quant_maxmin_th2 based on the position of the absolution difference between the two thresholds quant_maxmin_th1 and quant_maxmin_th2, as represented by the graph 402.

An example operation of the pre-segmentation module 102 for detecting an actual smoothly changing area is now described. In this example, the pre-segmentation module 102 applies a pre-segmentation process to the pixels 202 along the direction 206, to generate a pre-segmented area that roughly approximates an actual smoothly changing area. The segmentation module 104 then further refines the pre-segmented area.

In one example, the pixel of interest 204 is first included in the pre-segmented area. Then, on both left and right sides of the pixel of interest 204, the pre-segmentation process extends the pre-segmented area from close to far relative to the pixel 204, until one neighboring pixel of the pixel 204 in the pre-segmented area has a luminance value above the threshold th, and another neighboring pixel of the pixel 204 in the pre-segmented area has a luminance value below the threshold th.

Figure 5A:
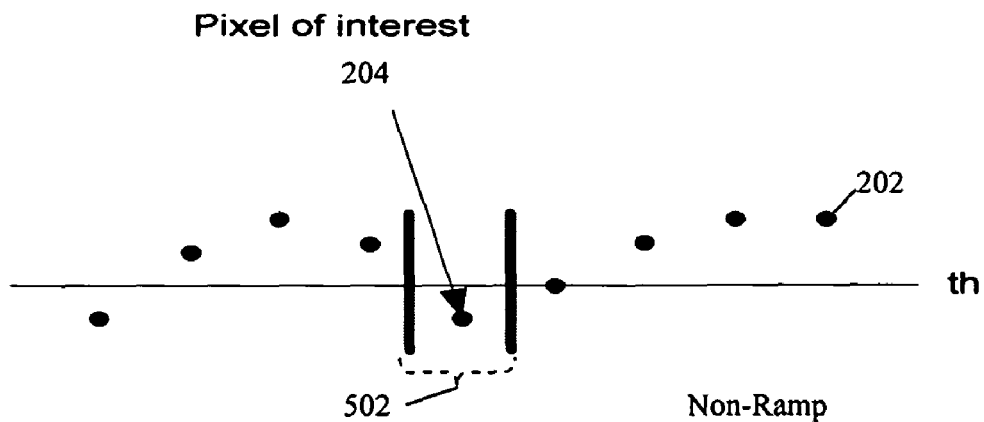
FIGS. 5A-B show examples of pre-segmentation in a chosen direction, according to an embodiment of the present invention.

FIG. 5A shows an example wherein the pixels 202 along the direction 206 are detected as being in a non-ramp area, and only the pixel of interest 204, itself, is in a pre-segmented area 502. For non-ramp areas, the threshold th can be determined as described further above (e.g., by averaging the luminance value of the pixels 202 in the direction 206).

Figure 5B:
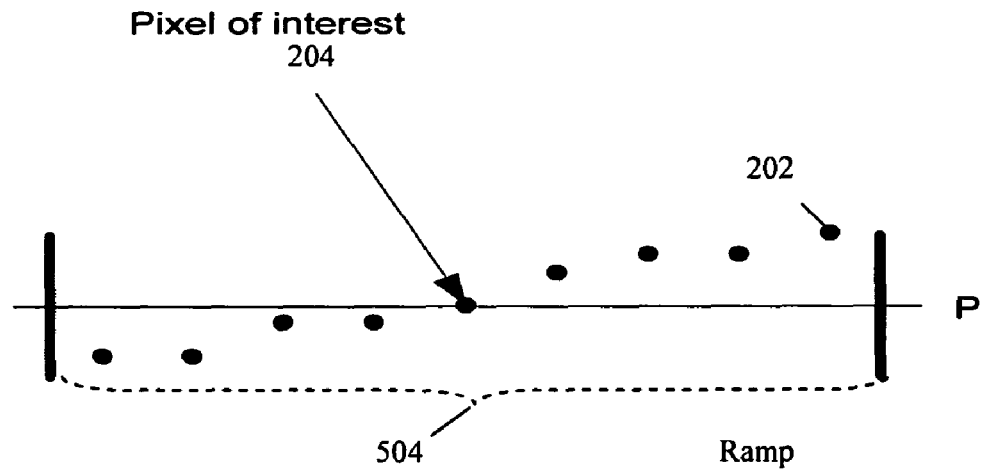

FIG. 5B shows an example wherein the pixels 202 along the direction 206 are detected to be in a ramp area, and the pixels of the whole row in direction 206 are in a pre-segmented area 504. For ramp areas, the threshold th is set to the luminance value P of the pixel of interest 204.

As in the ramp detection process above, the pixels with luminance value equal to the threshold th are temporally removed during the pre-segmentation process.

As noted, segmentation is applied by the segmentation module 104 only to the pre-segmented areas. In one example, on each side of the pixel of interest 204, the segmentation module 104 computes the luminance difference of neighboring pixels one-by-one from close to far relative to the pixel 204, to determine if the luminance difference is larger than the quantization level q. If so, the segmentation process in that direction is stopped. The pixels before the stop point are included in the resulting segment (i.e., the refined segment), along with the pixel of interest 204.

The refined segment contains a smoothly changing area in the image. The low-pass filtering module 106 performs low-pass filtering on the refined segment to obtain a higher precision luminance value for the pixel of interest 204 based on the luminance values of the pixels in the refined segment.

However, if the refined segment is not symmetric about the pixel of interest 204 (i.e., the center pixel), and the low-pass filtering is designed for a symmetric segment, then the filtered luminance value for the pixel of interest 204 may be biased. To avoid the bias, before low-pass filtering, the farthest pixel with respect to the pixel of interest 204 is discarded in different iterations, until the refined segment is symmetric about the pixel in the direction 206. This refined symmetric segment represents a smoothly changing area, and therefore, can be used to compute a higher precision value of the pixel of interest 204. Then, the low-pass filtering module 106 applies low-pass filtering to the symmetric refined segment.

In one example, low-pass filtering is applied only to the luminance values of the pixels in the refined symmetric segment. The low-pass filtering parameters can be arbitrary. One simple example involves using simple averaging of the luminance values within the segment as the higher precision output luminance value for the pixel 204. Other low-pass filters, such as Gaussian filters with different variances can also be used.

In this example, a maximum luminance $Y_{max}$ and a minimum luminance $Y_{min}$ of the pixels in the refined symmetric segment are recorded, and used later by the gain controller module 110 to determine an overall gain g, as described further below.

As noted, the gain controller module 110 uses certain luminance related measurements to derive an overall gain value g which is used by the mixer 114 to obtain an output pixel value based on the filtered luminance value of the pixel 204 and the original luminance value for the pixel 204. In one example, each such measurement leads to determining a sub-gain that ranges from 0 to 1. One or more of the sub-gains are used in determining an intermediate gain. Preferably, the three sub-gains are combined (e.g., multiplied together) to obtain the intermediate gain. In either case, the intermediate gain is spatially filtered to obtain an overall (final) gain g, that is used by the mixer 114.

Figure 6:
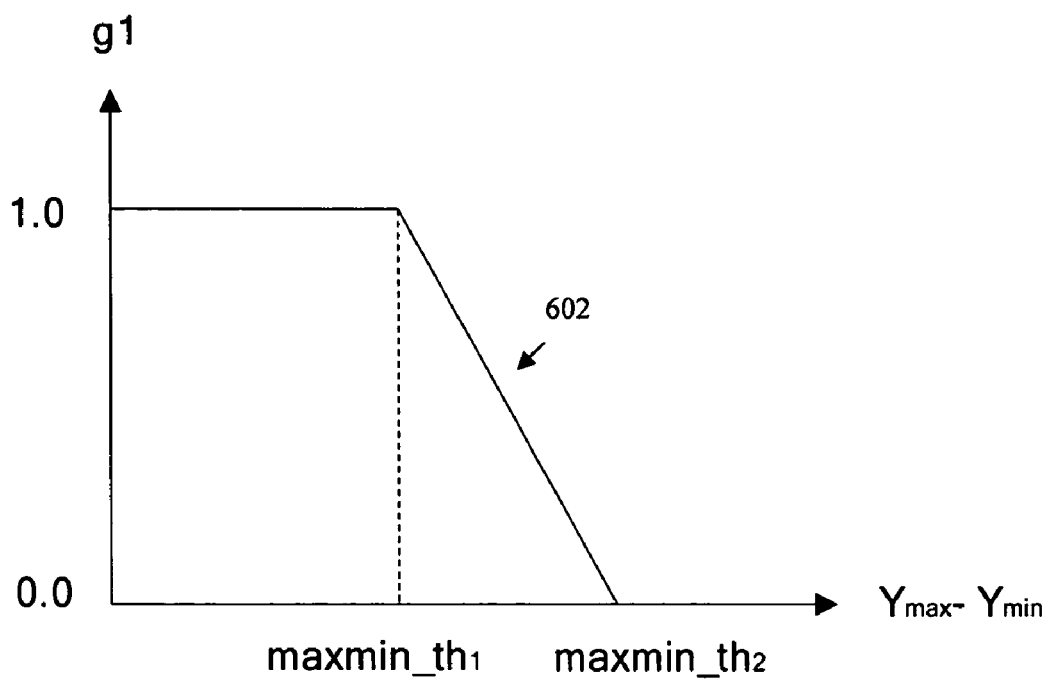
FIG. 6 shows an example of controlling a gain value based on the difference between the maximum luminance value and the minimum luminance value within a segment of the digitized image, according to an embodiment of the present invention.

Examples of such luminance related measurements are now described. A first measurement used by the gain controller module 110 involves determining a difference value between the aforementioned maximum and minimum luminance values $Y_{max}$ and $Y_{min}$, respectively. Then, a soft switching process is applied to said difference value to calculate a first sub-gain value g1. FIG. 6 shows a diagrammatical example 600 in which a graph 602 implements such a soft-switching process. Two threshold values are pre-defined as $maxmin\_th_1$ and $maxmin\_th_2$. Based on the graph 602: if the difference value is smaller than the smaller threshold $maxmin\_th_1$, then the sub-gain g1 is set to 1; if the difference value is larger than the larger threshold $maxmin\_th_2$, then the sub-gain g1 is set to 0; otherwise, the sub-gain g1 is set to a linearly interpolated value between 0 and 1 based on the position of the difference between the two thresholds $maxmin\_th_1$ and $maxmin\_th_2$.

As noted, a larger quantization level q is utilized for a steeper ramp. To reduce the quantization layer of a steeper ramp, the threshold values $maxmin\_th_1$ and $maxmin\_th_2$ should be increased to maintain the gain value. Thus, according to the example 700 shown in FIG. 7, the threshold values can be dynamically set based on the quantization level q according to the present invention.

Figure 7:
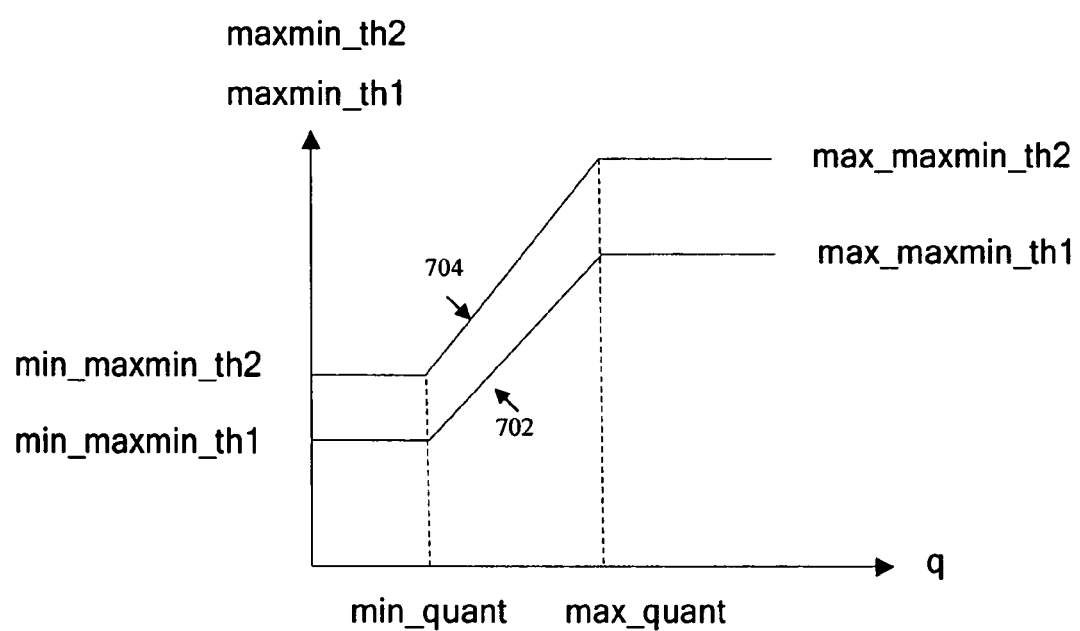
FIG. 7 shows an example of dynamically setting luminance thresholds based on quantization level, according to an embodiment of the present invention.

In FIG. 7, the thresholds maxmin_th1 and maxmin_th2 are dynamically selected based on the quantization level q, according to the example graphs 702 and 704, respectively. Specifically, if the quantization level q is smaller than the minimum quantization level min_quant, then the value $maxmin\_th_i$ (i=1, 2) is set to a pre-defined value $min\_maxmin\_th_i$; if the quantization level q is larger than the maximum quantization level max_quant, then the value $maxmin\_th_i$ is set to a pre-defined value $max\_maxmin\_th_i$; otherwise, the value $maxmin\_th_i$ is set to a linearly interpolated value between $min\_maxmin\_th_i$ and $max\_maxmin\_th_i$ based on the position of the quantization level q between the min_quant and max_quant values.

A second measurement used by the gain controller module 110, involves determining a difference value between the luminance P of the pixel of interest 204 and either the minimum luminance $Y_{min}$ or the maximum luminance $Y_{max}$ within the refined symmetric segment. A second sub-gain value g2 is determined based on this difference value. Generally, original small details in a scene show as peak or valley luminance values in a digitized image area (e.g., area 200 in FIG. 2). To avoid smoothing out such original small details, if the luminance value of the pixel of interest 204 is very close to the minimum or the maximum luminance value within the refined symmetric segmented area, the gain (e.g., sub-gain value g2) is reduced.

Figure 8A:
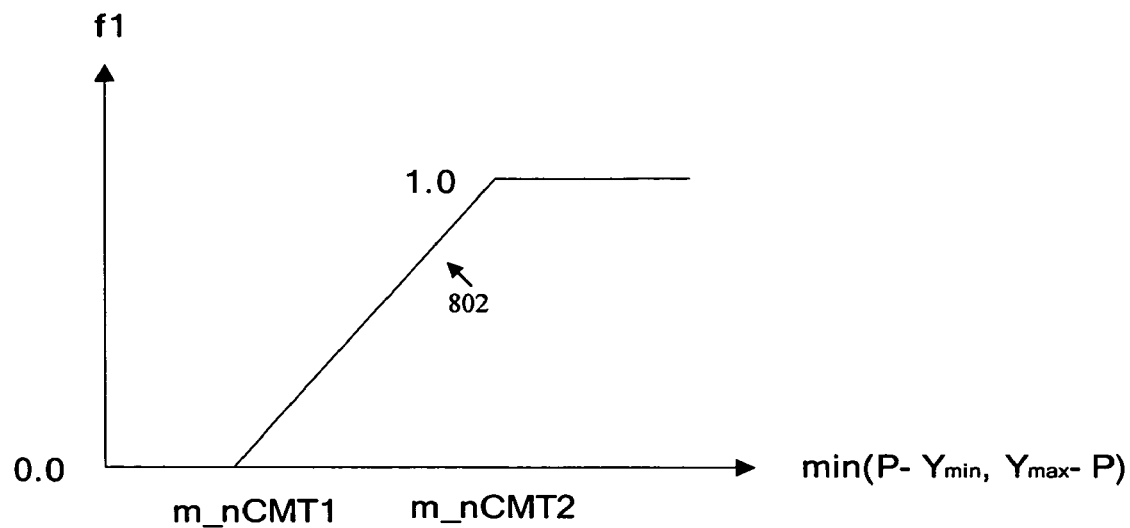
FIGS. 8A-B show examples of controlling gain values based on the difference between the luminance value of a pixel of interest and the luminance values within a symmetric segment of the digitized image, according to an embodiment of the present invention.

In one example, the sub-gain value g2, includes two gain components, f1 and f2. As shown by the example 800 in FIG. 8A, a minimum difference value, min ($P-Y_{min}$, $Y_{max}-P$), is soft-switched to obtain the gain component f1 using the switching graph 802, wherein the threshold values m_nCMT1 and m_nCMT2 are pre-defined. As such, the gain component f1 is controlled by the minimum of: (1) the difference between the luminance of the pixel of interest 204 and a minimum luminance in the refined symmetric segment, and (2) the difference between the luminance of the pixel of interest 204 and a maximum luminance value in the refined symmetric segment.

According to the graph 802: if the minimum difference value, min ($P-Y_{min}$, $Y_{max}-P$), is smaller than the smaller threshold m_nCMT1, then the gain component f1 is set to 0; if the minimum difference value is larger than the larger threshold m_nCMT2, the gain component f1 is set to 1; otherwise, the gain component f1 is set to a linearly interpolated value between 0 and 1 based on the position of said minimum difference value between the thresholds m_nCMT1 and m_nCMT2.

Figure 8B:
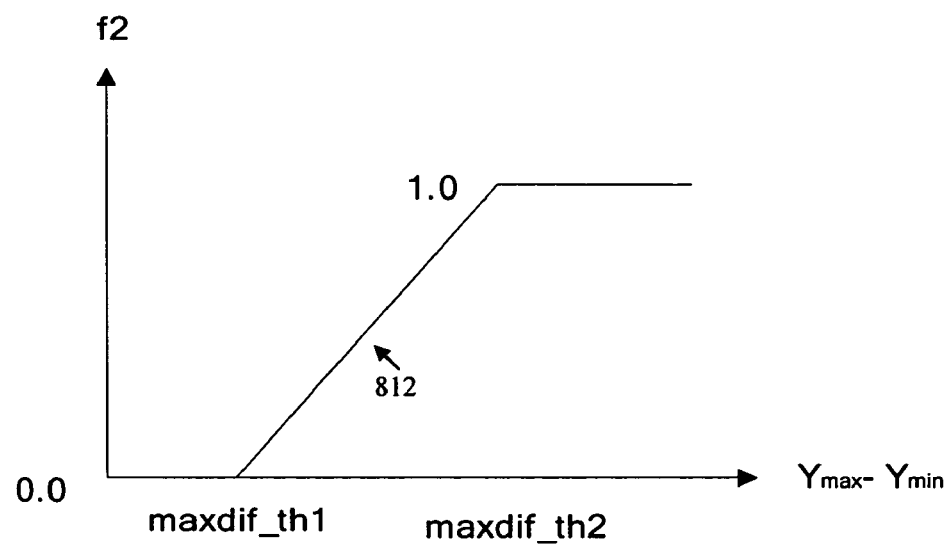

Further, as shown by the example 810 in FIG. 8B, the possibility of the refined symmetric segment area containing small details is checked based on the second gain component f2 according to the graph 812. As such, the gain component f2 indicates the possibility of small detail in the refined symmetric segment.

The gain component f2 is obtained by soft-switching the absolution difference between the maximum luminance value $Y_{max}$ and the minimum luminance value $Y_{min}$ according to the graph 812, wherein: if the absolution difference is smaller than a smaller threshold maxdif_th1, then the gain component f2 is set to 0; if the absolution difference is larger than the larger threshold maxdif_th2, then the gain component f2 is set to 1; otherwise, the gain component f2 is set to a linearly interpolated value between 0 and 1 based on the position of the difference between the two pre-defined thresholds maxdif_th1 and maxdif_th2.

If the difference between the maximum luminance value $Y_{max}$ and the minimum luminance value $Y_{min}$ is below a certain threshold, it is assumed that there are no small details in the refined symmetric segment. In that case, the value of the gain component f1 should not affect the overall gain. Thus, the second sub-gain g2 is computed as g2=1.0−(1.0−f1)*f2.

In order to take the presence of noise into account, a third measurement used by the gain controller module 110 involves determining the total number of sign changes of the neighboring differences along the chosen direction 206 within the refined symmetric segment. A sign change is defined as an instance of minimizing or maximizing the value of the pixel luminance values along the chosen direction. In one example, the luminance value of each pixel in the segment is compared to a certain threshold, using the average value of the maximum and the minimum luminance as the threshold. Based on the comparison, if a pixel luminance is higher than the threshold, then a value 1 is associated with that pixel, otherwise a value 0 is associated with that pixel. As such, each pixel of the symmetric segment will either have a value 0 or a value 1 associated therewith. Then, when moving from one pixel to the next along the direction 206, a sign change is counted each time an associated pixel value goes from 0 to 1 and back to 0, or goes from 1 to 0 and back to 1.

Figure 9:
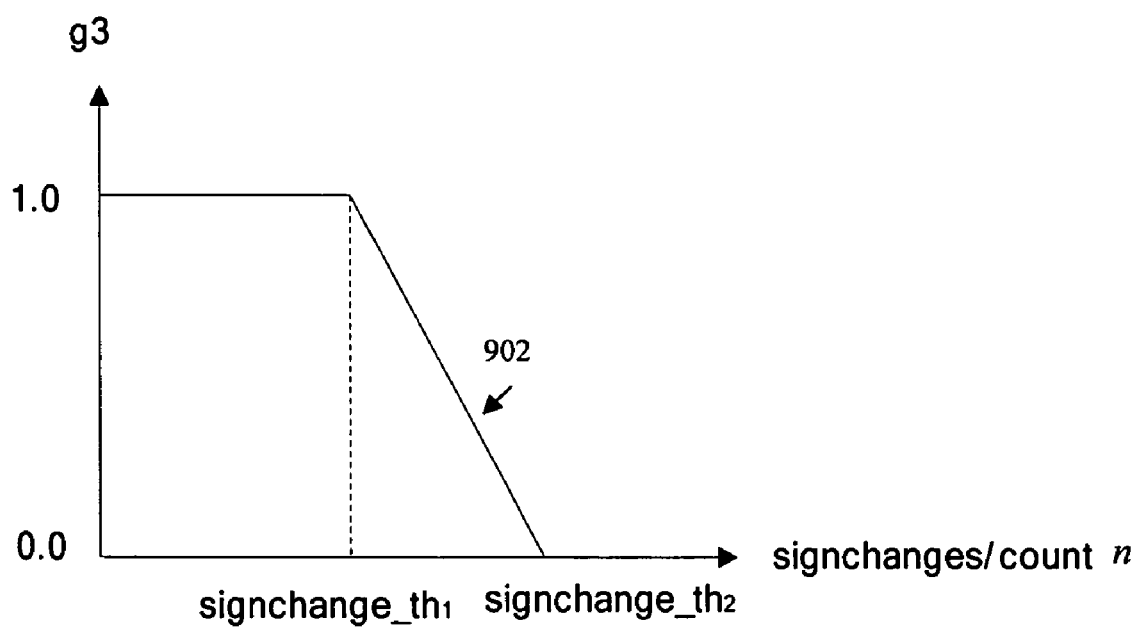
FIG. 9 shows an example of controlling a gain value based on the number of sign changes of neighboring pixel differences along a chosen direction in a symmetric segment of the digitized image, according to an embodiment of the present invention.

The number of sign changes counted is denoted as signchanges. As shown by the example 900 in FIG. 9, the ratio of the value signchanges to the total number of the pixels n within the refined symmetric segment is then soft-switched using the graph 902 to obtain a third sub-gain g3, wherein: if the ratio is smaller than a first predefined threshold signchange_th$_1$, then the sub-gain g3 is set to 1; if the ratio is larger than a second predefined threshold signchange_th$_2$ (wherein signchange_th$_1$<signchange_th$_2$), then the sub-gain g3 is set to 0; otherwise, the sub-gain g3 is set to a linearly interpolated value between 0 and 1 based on the position of the ratio between the two thresholds signchange_th$_1$ and signchange_th$_2$.

Figure 10:
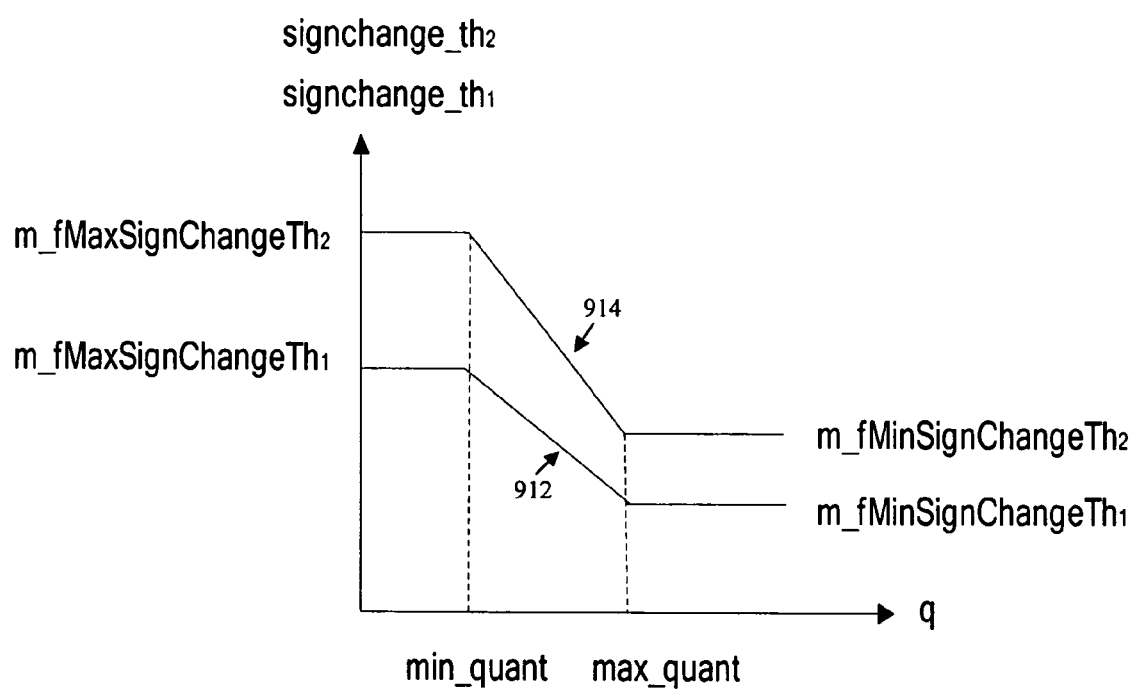
FIG. 10 shows an example of dynamically setting sign change thresholds based on the quantization level, according to an embodiment of the present invention.

To avoid over filtering, fewer sign changes should take place in steeper ramp areas. Thus, in the example 910 in FIG. 10, the threshold values signchange_th$_1$ and signchange_th$_2$ are dynamically set based on the quantization level q, according to the present invention. According to graphs 912 and 914 in FIG. 10: if the quantization level q is smaller than the minimum quantization level min_quant, then the value signchange_th$_i$ (i=1, 2) is set to a predefined value m_fMaxSignChangeTh$_i$; if the quantization level q is larger than the maximum quantization level max_quant, then the value signchange_th$_i$ is set to a predefined value m_fMinSignChangeTh$_i$ (wherein m_fMaxSignChangeTh$_i$>m_fMinSignChangeTh$_i$); otherwise, the value signchange_th$_i$ is set to a linearly interpolated value between the values m_fMaxSignChangeTh$_i$ and m_fMinSignChangeT$_i$ based on the position of the quantization level q between min_quant and max_quant.

The above three sub-gain values, g1, g2 and g3, are combined (e.g., multiplied) to obtain an intermediate gain value. In one example, the intermediate gain value can be used as the final gain value g by the mixer 114. In another example, the intermediate gain value is first processed in a spatial filter before being used by the mixer 114 as the final gain value g. In that case a 1×3 median filter, a 3×3 mean filter, etc., can be used. Different types of filters can be added in order to ensure a smooth transition of the output.

Figure 11:
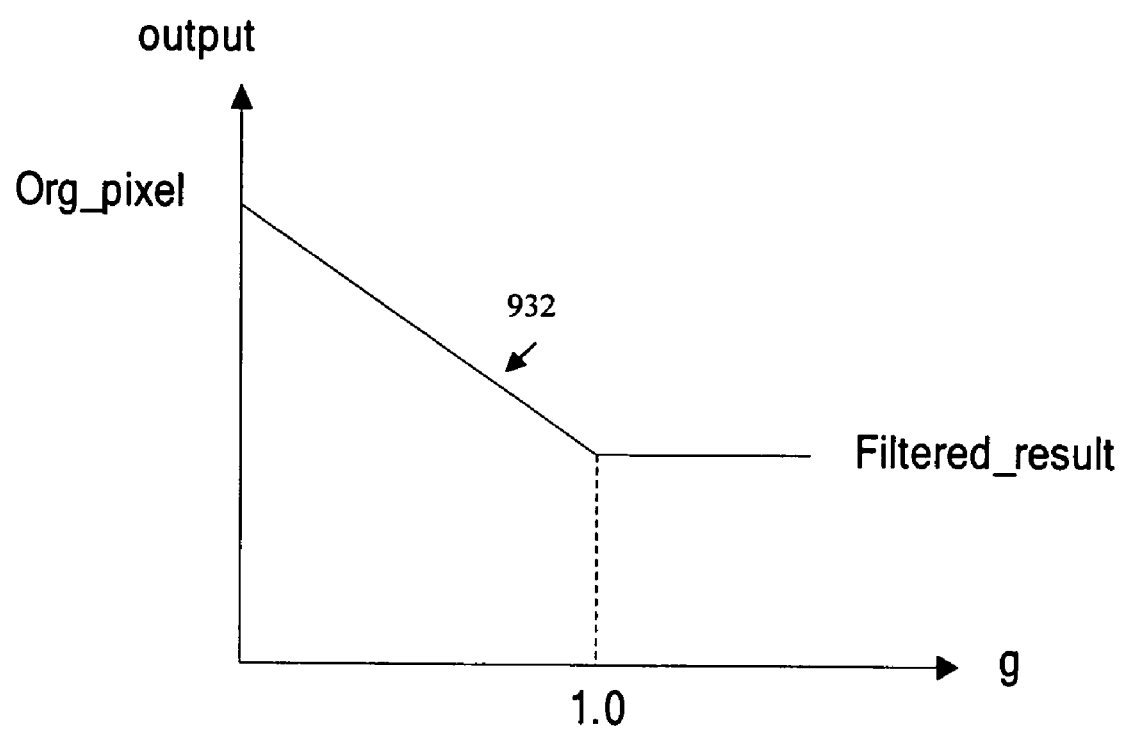
FIG. 11 shows an example of performing interpolation between an original luminance value and a low-pass filtered luminance value, according to an embodiment of the present invention.

The mixer 110 uses the overall gain g to combine the original luminance value of the pixel of interest 204 with the low-pass filtered (higher precision) luminance value of the pixel 204 generated by the filtering module 106. In one example, said original and low-pass filtered luminance values are linearly interpolated. FIG. 11 shows an example 930 wherein a linear interpolation process for the original (Org_pixel) and the filtered (Filtered_result) luminance values is performed based on the overall gain g and the graph 932. The interpolation result is then output as a higher precision output video, with reduced quantization layers and reduced quantization artifacts, compared to the input video.

As is known to those skilled in the art, the aforementioned example architectures described above, according to the present invention, can be implemented in many ways, such as program instructions for execution by a processor, as logic circuits, as an ASIC, as firmware, etc.

The present invention has been described in considerable detail with reference to certain preferred versions thereof; however, other versions are possible. Therefore, the spirit and scope of the appended claims should not be limited to the description of the preferred versions contained herein.

What is claimed:

1. A method of processing a quantized input image, comprising:
    employing a processor:
        detecting if a selected pixel in the quantized input image belongs to a ramp area in a selected direction;
        dynamically selecting a quantization level based on the detection results; and
        refining the pixel based on the selected quantization level.

2. The method of claim 1 wherein the refining step comprises increasing the precision of the pixel such that the refined pixel has a higher precision, and a reduced quantization layer, than the input pixel.

3. The method of claim 1 wherein:
    detecting if a selected pixel in the quantized input image belongs to a ramp area in a selected direction further comprises comparing the luminance of pixels in the selected direction to a threshold; and
    dynamically selecting the pixel quantization level further includes selecting the pixel quantization level based on the steepness of the ramp area.

4. The method of claim 1 wherein the selected quantization level is higher for a pixel in a ramp area than for a pixel in a non-ramp area.

5. The method of claim 1 wherein selecting the quantization level further includes the step of selecting a quantization level based on a set of pixels in the selected direction.

6. The method of claim 1, wherein the step of refining the pixel includes the steps of:

selecting a segment around the selected pixel, which includes a smoothly changing area in the input image; and refining the selected segment based on the quantization level to obtain a refined segment area.

7. The method of claim 6 further comprising the step of performing a low-pass filtering operation on the refined segment area to obtain a filtered area with higher precision pixel values.

8. The method of claim 7 further comprising the steps of:
performing luminance value measurements in the refined segment area; and
determining a gain value from the measured luminance values.

9. The method of claim 8 further comprising the step of:
using the gain value to mix the filtered and original luminance values of the selected pixel.

10. The method of claim 8, wherein the step of determining a gain value further includes the step of determining a sub-gain g1 based on a difference between a maximum luminance value $Y_{max}$ and a minimum luminance value $Y_{min}$ of the pixels within the refined segment.

11. The method of claim 8, wherein the step of determining a gain value further includes the step of determining a sub-gain g2 based on a difference between the luminance of the selected pixel, and either a minimum luminance $Y_{min}$ or a maximum luminance $Y_{max}$ within the refined segment.

12. The method of claim 8, wherein the step of determining a gain value further includes the step of determining a sub-gain g3 based on the neighboring pixel differences along the selected direction within the refined segment.

13. The method of claim 8, wherein the step of determining a gain value further includes the steps of:
determining a first sub-gain g1 based on a difference between a maximum luminance value $Y_{max}$ and a minimum luminance value $Y_{min}$ of the pixels within the refined segment;
determining a second sub-gain g2 based on a difference between the luminance of the selected pixel, and either a minimum luminance $Y_{min}$ or a maximum luminance $Y_{max}$ within the refined segment;
determining a third sub-gain g3 based on the neighboring pixel differences along the selected direction within the refined segment; and
determining the gain value based on a combination of two or more of the sub-gain values.

14. The method of claim 13 further comprising the step of determining the gain value by multiplying the three sub-gains together to obtain the gain value.

15. The method of claim 14 further comprising the step of determining the gain value by multiplying the three sub-gains together and spatially filtering the product to obtain the gain value.

16. The method of claim 11 wherein the step of determining the sub-gain g2 further includes the step of determining the sub-gain g2 as a function of a first gain component f1 that is based on the minimum of: (1) the difference between the luminance of the selected pixel and a minimum luminance in the refined segment, and (2) the difference between the luminance of the selected pixel and a maximum luminance value in the refined segment.

17. The method of claim 16 wherein the step of determining the sub-gain g2 further includes the step of determining the sub-gain g2 further as a function of a second gain component f2 that is based on the absolution difference between the maximum luminance value $Y_{max}$ and the minimum luminance value $Y_{min}$ in the refined segment.

18. An image processing system for processing a quantized input image, comprising:
an image processor including:
a detector that is configured to detect if a selected pixel in the quantized input image belongs to a ramp area in a selected direction;
a quantization level calculator that is configured to dynamically select a quantization level based on the detection results; and
a refining function that is configured to refine the pixel based on the selected quantization level.

19. The system of claim 18 wherein the refined pixel has a higher precision, and a reduced quantization layer, than the input pixel.

20. The system of claim 18 wherein the quantization level calculator that is configured to select the quantization level based on the steepness of the ramp area.

21. The system of claim 18 wherein the selected quantization level is higher for a pixel in a ramp area than for a pixel in a non-ramp area.

22. The system of claim 18 wherein the quantization level calculator is further configured to select a quantization level based on a set of pixels in the selected direction.

23. The system of claim 18, wherein the refining function comprises:
a pre-segmenter that is configured to select a segment around the selected pixel in the selected direction, wherein the segment includes a smoothly changing area in the input image; and
a segmenter that is configured to refine the segment based on the quantization level to obtain a refined segment area.

24. The system of claim 18 further comprising a low-pass filter that is configured to perform a low-pass filtering operation on the refined segment area to obtain a filtered area with higher precision pixel values.

25. The system of claim 24 further comprising:
a gain controller that is configured to obtain luminance value measurements for the refined segment area, and determine a gain value from the measured luminance values.

26. The system of claim 25 further comprising:
a mixer that is configured to mix the filtered and original luminance values of the selected pixel based on the gain value.

27. The system of claim 25, wherein the gain controller is further configured to determine a sub-gain g1 based on a difference between a maximum luminance value $Y_{max}$ and a minimum luminance value $Y_{min}$ of the pixels within the refined segment.

28. The system of claim 25, wherein the gain controller is further configured to determine a sub-gain g2 based on a difference between the luminance of the selected pixel, and either a minimum luminance $Y_{min}$ or a maximum luminance $Y_{max}$ within the refined segment.

29. The method of claim 25, wherein the gain controller is further configured to determine a sub-gain g3 based on the neighboring pixel differences along the selected direction within the refined segment.

30. The system of claim 25, wherein the gain controller is further configured to:
determine a first sub-gain g1 based on a difference between a maximum luminance value $Y_{max}$ and a minimum luminance value $Y^{min}$ of the pixels within the refined segment;
determine a second sub-gain g2 based on a difference between the luminance of the selected pixel, and either a minimum luminance $Y_{min}$ or a maximum luminance $Y_{max}$ within the refined segment;

determine a third sub-gain g3 based on the neighboring pixel differences along the selected direction within the refined segment; and determine the gain value based on a combination of two or more of the sub-gain values.

31. The system of claim 30 wherein the gain controller is further configured to determine the gain value by multiplying the three sub-gains together to obtain the gain value.

32. The system of claim 31 wherein the gain controller is further configured to determine the gain value by multiplying the three sub-gains together and spatially filtering the product to obtain the gain value.

33. The system of claim 28 wherein the gain controller is further configured to determine the sub-gain g2 as function of a first gain component f1 that is based on the minimum of: (1) the difference between the luminance of the selected pixel and a minimum luminance in the refined segment, and (2) the difference between the luminance of the selected pixel and a maximum luminance value in the refined segment.

34. The system of claim 33 wherein the gain controller is further configured to determine the sub-gain g2 further as a function of a second gain component f2 that is based on the absolution difference between the maximum luminance value $Y_{max}$ and the minimum luminance value $Y_{min}$ in the refined segment.

35. An image processor for processing a quantized input image, comprising:
a detector that is configured to detect if a selected pixel in the quantized input image belongs to a ramp area in a selected direction;
a quantization level calculator that is configured to dynamically select a quantization level based on the steepness of a detected ramp area;
a pre-segmenter that is configured to select a segment around the selected pixel in the selected direction, wherein the segment includes a smoothly changing area in the input image; and
a segmenter that is configured to refine the segment based on the quantization level to obtain a refined segment area with a reduced quantization layer.

36. The image processor of claim 35 further comprising a low-pass filter that is configured to perform a low-pass filtering operation on the refined segment area to obtain a filtered area with higher precision pixel values.

37. The image processor of claim 36 further comprising:
a gain controller that is configured to obtain luminance value measurements for the refined segment area, and determine a gain value from the measured luminance values.

38. An image processor for processing a quantized input image, comprising:
a detector that is configured to detect if a selected pixel in the quantized input image belongs to a ramp area in a selected direction;
a quantization level calculator that is configured to dynamically select a quantization level based on the steepness of a detected ramp area;
a pre-segmenter that is configured to select a segment around the selected pixel in the selected direction, wherein the segment includes a smoothly changing area in the input image;
a segmenter that is configured to refine the segment based on the quantization level to obtain a refined segment area with a reduced quantization layer;
a low-pass filter that is configured to perform a low-pass filtering operation on the refined segment area to obtain a filtered area with higher precision pixel values;
a gain controller that is configured to obtain luminance value measurements for the refined segment area, and determine a gain value from the measured luminance values; and
a mixer that is configured to mix the filtered and original luminance values of the selected pixel based on the gain value.

39. The image processor of claim 38 further comprising:
a mixer that is configured to mix the filtered and original luminance values of the selected pixel based on the gain value.

40. The image processor of claim 39, wherein the gain controller is further configured to:
determine a first sub-gain g1 based on a difference between a maximum luminance value $Y_{max}$ and a minimum luminance value $Y_{min}$ of the pixels within the refined segment;
determine a second sub-gain g2 based on a difference between the luminance of the selected pixel, and either a minimum luminance $Y_{min}$ or a maximum luminance $Y_{max}$ within the refined segment;
determine a third sub-gain g3 based on the neighboring pixel differences along the selected direction within the refined segment; and
determine the gain value based on a combination of two or more of the sub-gain values.

41. The image processor of claim 40 wherein the gain controller is further configured to determine the gain value by multiplying the three sub-gains together to obtain the gain value.

42. The image processor of claim 41 wherein the gain controller is further configured to determine the gain value by multiplying the three sub-gains together and spatially filtering the product to obtain the gain value.

43. The image processor of claim 42 wherein the gain controller is further configured to determine the sub-gain g2 as function of a first gain component f1 that is based on the minimum of: (1) the difference between the luminance of the selected pixel and a minimum luminance in the refined segment, and (2) the difference between the luminance of the selected pixel and a maximum luminance value in the refined segment.

44. The image processor of claim 43 wherein the gain controller is further configured to determine the sub-gain g2 further as a function of a second gain component f2 that is based on the absolution difference between the maximum luminance value $Y_{max}$ and the minimum luminance value $Y_{min}$ in the refined segment.

* * * * *